United States Patent
Kukita

(10) Patent No.: US 8,836,840 B2
(45) Date of Patent: *Sep. 16, 2014

(54) A/D CONVERTER, SOLID-STATE IMAGE SENSING DEVICE, AND CAMERA SYSTEM

(71) Applicant: Sony Corporation, Tokyo (JP)

(72) Inventor: Manabu Kukita, Fukuoka (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,211

(22) Filed: Dec. 7, 2012

(65) Prior Publication Data

US 2013/0201375 A1 Aug. 8, 2013

Related U.S. Application Data

(63) Continuation of application No. 12/659,505, filed on Mar. 11, 2010, now Pat. No. 8,350,941.

(30) Foreign Application Priority Data

Apr. 14, 2009 (JP) ................................. 2009-097885

(51) Int. Cl.
H04N 3/14 (2006.01)
H04N 5/335 (2011.01)
H04N 5/369 (2011.01)
H04N 5/378 (2011.01)
H04N 5/232 (2006.01)

(52) U.S. Cl.
CPC ............. *H04N 5/3698* (2013.01); *H04N 5/378* (2013.01); *H04N 5/23241* (2013.01)
USPC ............ 348/308; 348/302; 341/164; 341/169

(58) Field of Classification Search
CPC ......... H03M 1/34; H03M 1/56; H04N 5/3742
USPC ......... 348/308; 341/164, 169, 170; 250/208.1
See application file for complete search history.

(56) References Cited

U.S. PATENT DOCUMENTS

| 4,254,406 A | 3/1981 | Meares |
| 2005/0195304 A1 | 9/2005 | Nitta et al. |
| 2006/0158541 A1 | 7/2006 | Ichikawa |

FOREIGN PATENT DOCUMENTS

| JP | 2005-278135 | 10/2005 | |
| WO | WO-2008-044433 A1 | 4/2008 | |
| WO | WO2008044433 | * 4/2008 | ............ H04N 5/335 |

OTHER PUBLICATIONS

W. Yang et al., "An Integrated 800x600 CMOS Image System," ISSCC Digest of Technical Papers, pp. 304-305, Feb. 1999.

*Primary Examiner* — Paul Berardesca
(74) *Attorney, Agent, or Firm* — Rader, Fishman & Grauer PLLC

(57) ABSTRACT

An A/D converter includes: a first comparator that compares an input signal, with a first reference signal which is a ramp wave having a predetermined polarity, and that when the input signal matches the first reference signal, reverses an output signal thereof; a second comparator that compares the input signal, with a second reference signal which is a ramp wave having a different polarity from the first reference signal, and that when the input signal matches the second reference signal, reverses an output signal thereof; and a counter capable of counting up so as to measure the comparison times taken by the first comparator and second comparator, wherein when either of the output signal of the first comparator and the output signal of the second comparator is first reversed, the counter ceases a counting action.

18 Claims, 8 Drawing Sheets

A/D CONVERTER, SOLID-STATE IMAGE SENSING DEVICE, AND CAMERA SYSTEM

BACKGROUND OF THE INVENTION

1. Field of the Invention

The present invention relates to an A/D converter capable of being employed in a solid-state image sensing device represented by a CMOS image sensor, a solid-state image sensing device, and a camera system.

2. Description of the Related Art

For complementary metal-oxide semiconductor (CMOS) image sensors, the same manufacturing process as that for typical CMOS integrated circuits can be adopted. The CMOS image sensor can be driven with a sole power supply. Further, analog circuits and logical circuits can be integrated into the same chip using a CMOS process.

Therefore, the CMOS image sensor has plural merits including the merit of helping decrease the number of peripheral ICs.

As for charge-coupled device (CCD) output circuits, a mainstream CCD output circuit provides an output on a one channel using a floating diffusion (FD) amplifier which has a floating diffusion layer.

In contrast, a mainstream CMOS image sensor has the FD amplifiers disposed in respective pixels, and provides a column-parallel output by selecting a certain row in an array of pixels and simultaneously reading pixels in the row in the direction of columns.

This is because since it is hard to obtain a sufficient driving ability from the FD amplifiers disposed in the pixels, it is necessary to decrease a data rate. From this viewpoint, parallel processing is thought to be advantageous.

As for a pixel signal reading (output) circuit to be employed in a column-parallel output type CMOS image sensor, various circuits have been proposed.

One of the most advanced types is such that analog-to-digital converters (hereinafter, abbreviated as ADC) are disposed in respective columns and pixel signals are fetched in the form of digital signals.

The column-parallel output type CMOS image sensor including the ADC has been disclosed in, for example, "An Integrated 800×600 CMOS Image System" written by W. Yang et al. (ISSCC Digest of Technical Papers, pp. 304-305, February, 1999) (non-patent document 1) and JP-A-2005-278135 (patent document 1).

FIG. 1 is a block diagram showing an example of the configuration of a column-parallel ADC inclusive solid-state image sensing device (CMOS image sensor).

The solid-state image sensing device 1 includes, as shown in FIG. 1, a pixel array 2, a vertical scan circuit, a horizontal transfer scan circuit 4, and a group of column processing circuits 5 that is a group of ADC.

Further, the solid-state image sensing device 1 includes a digital-to-analog converter (hereinafter, abbreviated as DAC) 6 and an amplification circuit (S/A) 7.

The pixel array 2 has unit pixels 21, each of which includes a photodiode (photoelectric converter) and an intra-pixel amplifier, arranged in the form of a matrix.

The group of column processing circuits 5 has plural column processing circuits 51, each of which serves as an ADC, arrayed in columns.

Each of the column processing circuits (ADC) 51 includes a comparator 51-1 that compares an analog signal, which is obtained from one of pixels in each row over a vertical signal line, with a reference voltage Vslop which is a ramp wave (RAMP) obtained by changing a reference voltage produced by the DAC 6, stepwise.

Further, each of the column processing circuits 51 includes a counter 51-2 that counts up so as to measure the comparison time taken by the comparator 51-1, and a latch (memory) 51-3 that holds a result of counting.

The column processing circuits 51 have an n-bit digital signal converting capability, and are disposed on respective vertical signal lines (column lines) 8-1 to 8-8, whereby column-parallel ADC blocks are constructed.

The output terminals of the memories 51-3 are connected to a horizontal transfer line 9 whose bit width is, for example, 2n.

2n amplification circuits 7 which are arranged correspondingly to the horizontal transfer line 9 is disposed.

FIG. 2 is a timing chart for the circuits shown in FIG. 1.

In each of the column processing circuits (ADC) 51, an analog signal (potential Vsl) read onto the vertical signal line 8 is compared with a reference voltage Vslop (a wave that varies linearly with a certain slope) by the comparator 51-1 disposed in each column.

At this time, the counter 51-2 counts up until the level of the analog potential Vsl crosses the level of the reference voltage Vslop and the output of the comparator 51-1 is reversed. The potential (analog signal) Vsl on the vertical signal line is converted into a digital signal (A/D converted).

The A/D conversion is performed twice with respect to one time of reading.

During the first A/D conversion, a reset level (P-phase level) attained in the unit pixel 21 is read onto the vertical signal line 8 (any of the vertical signal lines 8-1 to 8-n), and then A/D converted.

The P-phase level or the reset level is affected with a variance among pixels.

During the second A/D conversion, the level of a signal photoelectrically converted in each unit pixel 21 (D-phase level) is read onto the vertical signal line 8 (any of the vertical signal lines 8-1 to 8-n), and then A/D converted.

The D-phase level is also affected with the variance among pixels. Subtraction of the P-phase level from the D-phase level is executed in order to achieve correlated double sampling (CDS).

A signal converted into a digital signal is recorded in each of the memories 51-3. The digital signals are sequentially read from the memories into the amplification circuit 7 over the horizontal transfer line 9 by the horizontal (column) scan circuit 4, and finally outputted.

Thus, column-parallel output processing is carried out.

SUMMARY OF THE INVENTION

However, the solid-state image sensing device having the foregoing constitution has the demerit that since it takes much time to perform A/D converting processing, reading is time-consuming.

For example, when a 10-bit counter is employed, $2^{10}$ (1024) clock pulses are necessary. When the resolution of an A/D converter is increased by one bit, $2^{11}$ (2048) clock pulses, that is, a double number of clock pulses becomes necessary. The number of clock pulses increases exponentially.

Therefore, since a frame time is limited, it becomes hard to improve the resolution of an A/D converter along with an increase in the number of pixels.

Reduction in the power consumption of a counter has become an issue that has to be overcome.

Accordingly, there is a need for an A/D converter capable of realizing A/D conversion with high bit precision without the necessity of raising a clock frequency or increasing a reading time, a solid-state image sensing device, and a camera system.

According to an embodiment of the present invention, there is provided an A/D converter including: a first comparator that compares an input signal, with a first reference signal which is a ramp wave having a predetermined polarity, and that when the input signal matches the first reference signal, reverses an output signal thereof; a second comparator that compares the input signal, with a second reference signal which is a ramp wave having a different polarity from the first reference signal, and that when the input signal matches the second reference signal, reverses an output signal thereof; and a counter capable of counting up so as to measure the comparison times taken by the first comparator and second comparator. When either of the output signal of the first comparator and the output signal of the second comparator is reversed first, the counter ceases a counting action.

According to another embodiment of the present invention, there is provided a solid-state image sensing device including a pixel array having plural pixels, which perform photoelectric conversion, arrayed in the form of a matrix, and pixel signal reading circuits that read pixel signals from the pixel array in units of plural pixels. The pixel signal reading circuits each include corresponding to columns of pixels: a first comparator that compares an input signal, with a first reference signal which is a ramp wave having a predetermined polarity, and that when the input signal matches the first reference signal, reverses an output signal thereof; a second comparator that compares the input signal, with a second reference signal which is a ramp wave having a different polarity from the first reference signal, and that when the input signal matches the second reference signal, reverses an output signal thereof; and a counter capable of counting up so as to measure the comparison times taken by the first and second comparators. When either of the output signal of the first comparator and the output signal of the second comparator is first reversed, the counter ceases a counting action.

According to still another embodiment of the present invention, there is provided a camera system including a solid-state image sensing device, and an optical system that forms a subject image on the solid-state image sensing device. The solid-state image sensing device includes a pixel array having plural pixels, which perform photoelectric conversion, arrayed in the form of a matrix, and pixel signal reading circuits that read pixel signals from the pixel array in units of plural pixels. The pixel signal reading circuits each include corresponding to columns of pixels: a first comparator that compares an input signal, with a first reference signal which is a ramp wave having a predetermined polarity, and that when the input signal matches the first reference signal, reverses an output signal thereof; a second comparator that compares the input signal, with a second reference signal which is a ramp wave having a different polarity from the first reference signal, and that when the input signal matches the second reference signal, reverses an output signal thereof; and a counter capable of counting up so as to measure the comparison times taken by the first and second comparators. When either of the output signal of the first comparator and the output signal of the second comparator is first reversed, the counter ceases a counting action.

According to the embodiments of the present invention, an input signal is compared with the first reference voltage and second reference voltage by the first and second comparators. At this time, the counter counts up until the level of the analog input signal matches the level of the first or second reference voltage, and either of the outputs of the first comparator and second comparator is reversed. The output of the comparator that is reversed first is used to convert the analog input signal into a digital signal (to A/D convert the analog input signal).

According to the embodiments of the present invention, A/D conversion with high bit precision can be achieved without the necessity of raising a clock frequency or increasing a reading time. This leads to a decrease in a reversing time it takes for a high-power output. Therefore, A/D conversion can be achieved at a higher speed than that in an ordinary constitution.

Since an executing time for A/D conversion is shortened, the power consumption can be reduced.

DESCRIPTION OF THE PREFERRED EMBODIMENTS

Figure 1:
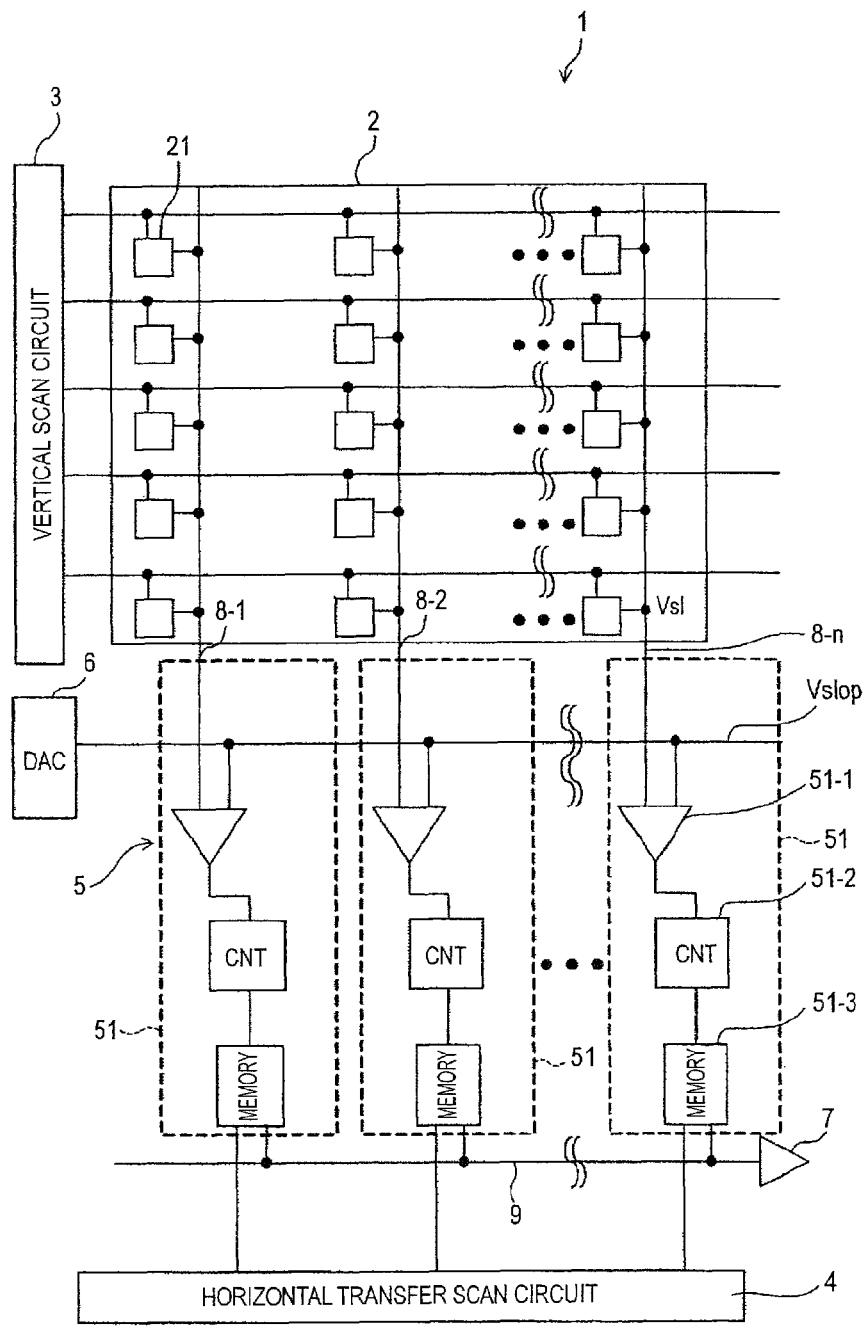
FIG. 1 is a block diagram showing an example of the configuration of a column-parallel ADC inclusive solid-state image sensing device (CMOS image sensor)
Figure 2:
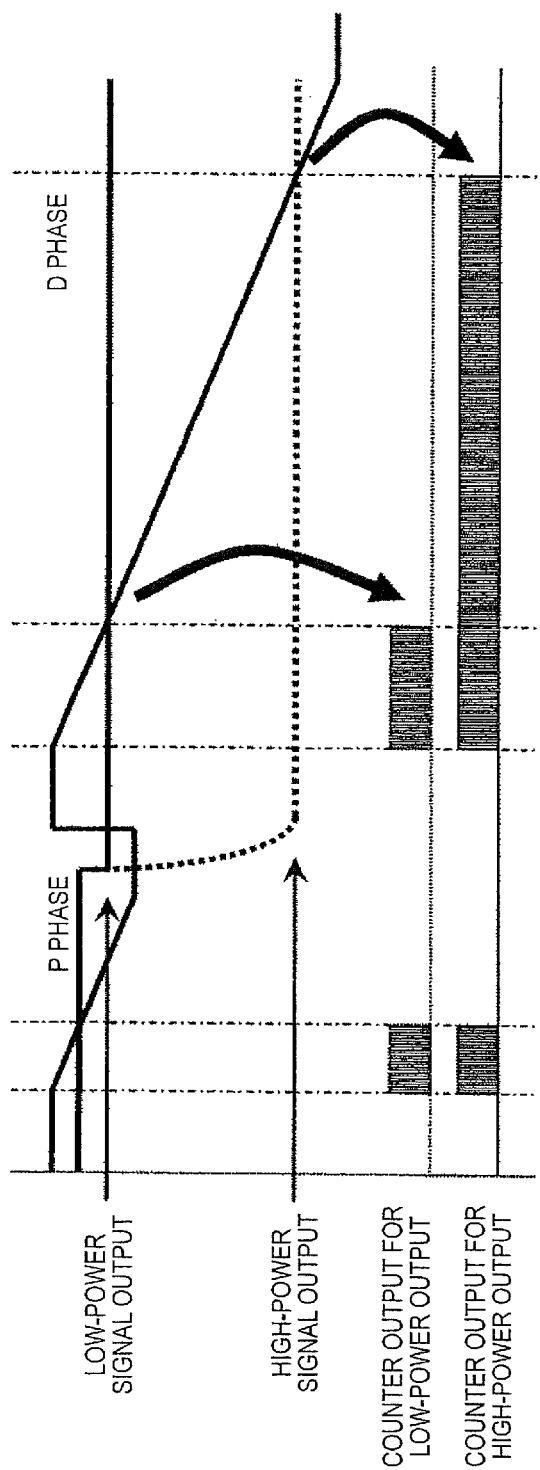
FIG. 2 is a timing chart concerning circuits shown in FIG. 1.

Referring to the drawings, an embodiment of the present invention will be described below. A description will be made by orderly following subjects presented below.

1. Example of the overall configuration of a solid-state image sensing device
2. Example of the configuration of a column ADC
3. Example of the configuration of a DAC
4. Example of the configuration of a camera system FIG. 3 is a block diagram showing an example of the configuration of a column-parallel ADC inclusive solid-state image sensing device (CMOS image sensor) in accordance with an embodiment of the present invention.

Figure 3:
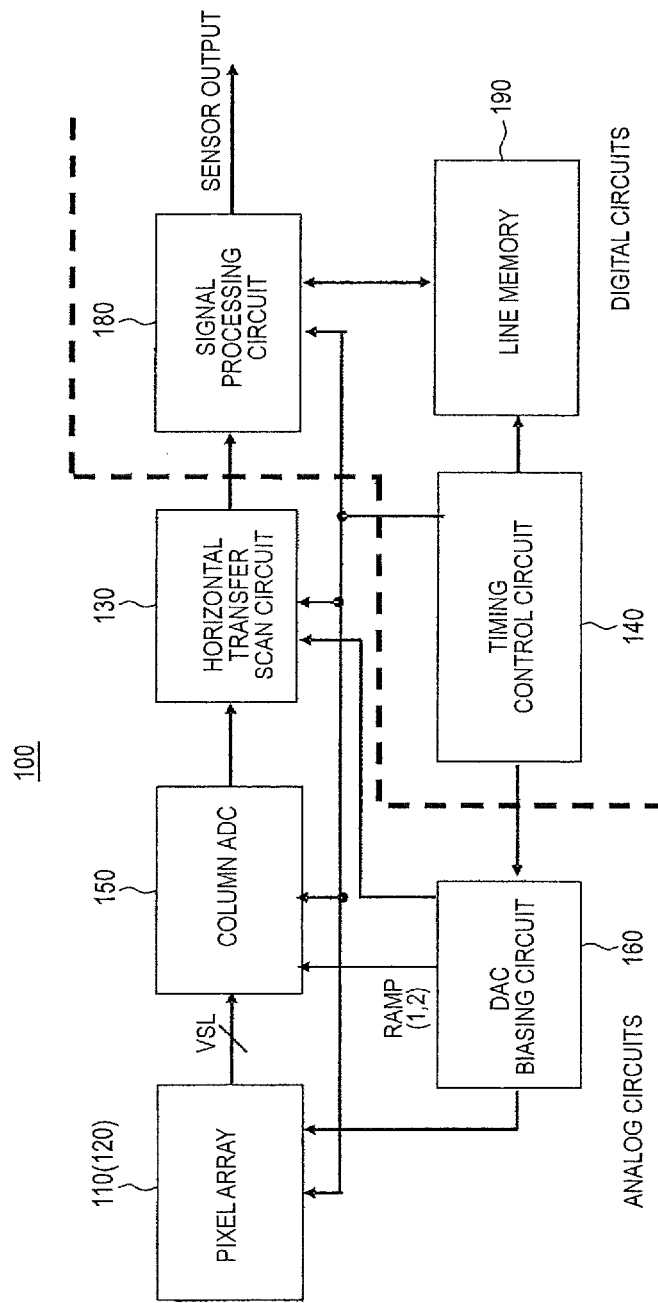
FIG. 3 is a block diagram showing an example of the configuration of a column-parallel ADC inclusive solid-state image sensing device (CMOS image sensor) in accordance with an embodiment of the present invention.
Figure 4:
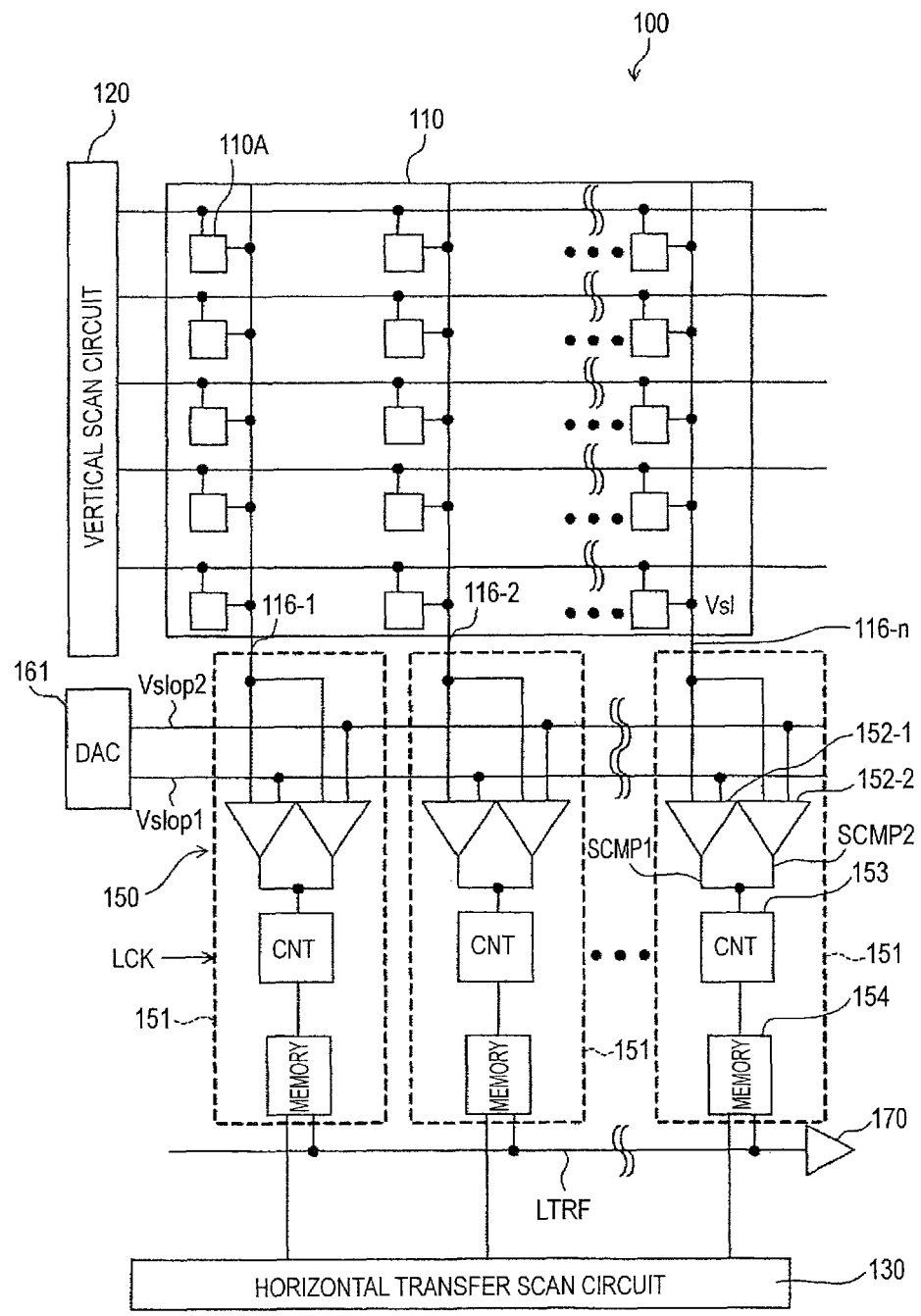
FIG. 4 is a block diagram showing more concretely a group of ADC included in the column-parallel ADC inclusive solid-state image sensing device (CMOS image sensor) shown in FIG. 3.

FIG. 4 is a block diagram showing more concretely a group of ADC included in the column-parallel ADC inclusive solid-state image sensing device (CMOS image sensor) shown in FIG. 3.

<1. Example of the Overall Configuration of a Solid-State Image Sensing Device>

A solid-state image sensing device 100 includes, as shown in FIG. 3 and FIG. 4, a pixel array 110 serving as an imaging unit, a vertical scan circuit 120, a horizontal transfer scan circuit 130, and a timing control circuit 140.

Further, the solid-state image sensing device 100 includes a group of column processing circuits 150 that is a group of ADC and serving as pixel signal reading circuits, and a DAC and biasing circuit 160 including a DAC (digital-to-analog converter) 161.

The solid-state image sensing device 100 further includes an amplification circuit (S/A) 170, a signal processing circuit 180, and a line-memory 190.

Among the foregoing components, the pixel array 110, vertical scan circuit 120, horizontal transfer scan circuit 130, group of ADC 150, DAC and biasing circuit 160, and amplification circuit (S/A) 170 are formed with analog circuits.

The timing control circuit 140, signal processing circuit 180, and line memory 190 are formed with digital circuits.

The pixel array 110 has plural unit pixels 110A, each of which includes a photodiode (photoelectric converter) and an intra-pixel amplifier, and is arrayed two-dimensionally (in the form of a matrix) in m rows and n columns.

[Example of the Configuration of a Unit Pixel]

Figure 5:
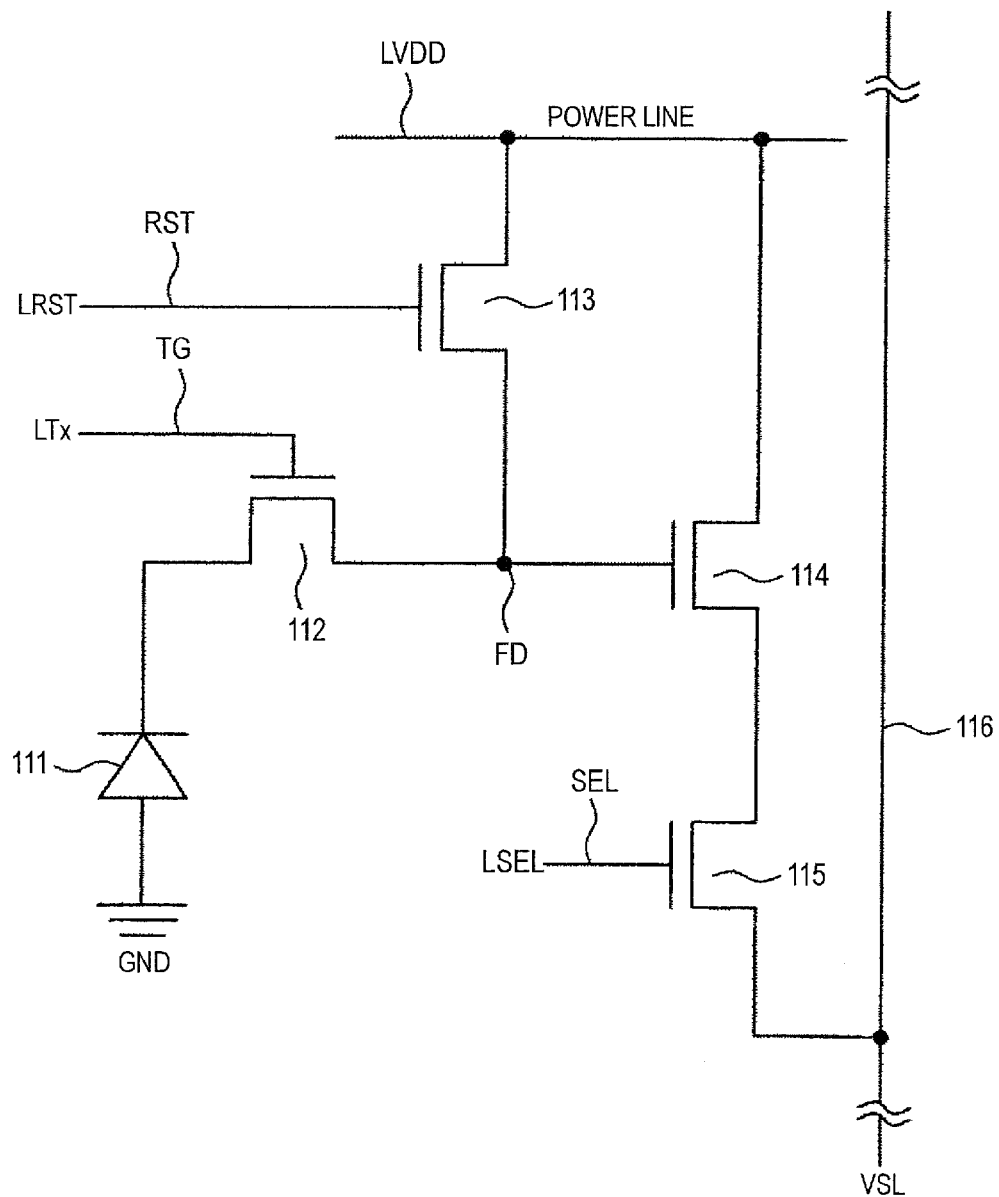
FIG. 5 is a diagram showing an example of a pixel included in the CMOS image sensor in accordance with the embodiment and composed of four transistors.

FIG. 5 is a diagram showing an example of a pixel included in the CMOS image sensor in accordance with the embodiment and composed of four transistors.

The unit pixel 110A includes, for example, a photodiode 111 serving as a photoelectric converter.

The unit pixel 110A includes, with respect to the photodiode 111, as active elements, four transistors of a transfer transistor 112 serving as a transfer element, a reset transistor 113 serving as a reset element, an amplification transistor 114, and a selection transistor 115.

The photodiode 111 photoelectrically converts incident light into an amount of charge (herein, electrons) proportional to the amount of light.

The transfer transistor 112 is connected between the photodiode 111 and a floating diffused junction FD serving as an output node.

When a driving signal TG is applied to the gate (transfer gate) of the transfer transistor 112 over a transfer control line LTx, the transfer transistor 112 transfers electrons, which result from photoelectric conversion performed by the photodiode 111, to the floating diffused junction FD.

The reset transistor 113 is connected between a power line LVDD and the floating diffused junction FD.

When a reset signal RST is applied to the gate of the reset transistor 113 over a reset control line LRST, the reset transistor 113 resets the potential at the floating diffused junction FD into the potential on the power line LVDD.

The gate of the amplification transistor 114 is connected to the floating diffused junction FD. The amplification transistor 114 is connected onto a signal line 116 via the selection transistor 115, and forms a source follower together with a constant current source disposed outside the pixel array.

When a control signal (address signal or select signal) SEL is applied to the gate of the selection transistor 115 over a selection control line LSEL, the selection transistor 115 is turned on.

When the selection transistor 115 is turned on, the amplification transistor 119 amplifies the potential at the floating diffused junction FD, and outputs a voltage, which corresponds to the potential, onto the signal line 116. Voltages outputted from pixels over the signal line 116 are fed to the column processing circuit 150 serving as a pixel signal reading circuit.

Since the gates of, for example, the transfer transistors 112, reset transistors 113, and selection transistors 115 are interconnected in each of rows, the foregoing actions are simultaneously performed in parallel on the pixels in one row.

In the pixel array 110, the reset control line LRST, transfer control line LTx, and selection control line LSEL are laid down as a set of lines in each of the rows in the array of pixels.

The reset control line LRST, transfer control line LTx, and selection control line LSEL are driven by the vertical scan circuit 120 serving as a pixel drive unit.

In the solid-state image sensing device 100, the timing control circuit 190 that produces an internal clock and serves as a control circuit which sequentially reads signals from the pixel array 110, the vertical scan circuit 120 that controls a row address and row scanning, and the horizontal transfer scan circuit 130 that controls a column address and column scanning are arranged.

The timing control circuit 140 produces timing signals necessary to pieces of signal processing to be performed by the pixel array 110, vertical scan circuit 120, horizontal transfer scan circuit 130, column processing circuit 150, DAC and biasing circuit 160, signal processing circuit 180, and line memory 190.

In the pixel array 110, a picture or a screen image is photoelectrically converted in units of a row of pixels through photon accumulation and discharge to be achieved using a line shutter. An analog signal VSL is outputted to each of the column processing circuits 151 belonging to the group of column processing circuits 150.

<2. Example of the Configuration of the Column ADC>

The group of column processing circuits 150 has the juxtaposed plural column processing circuits 151, which are ADC blocks.

Namely, the group of column processing circuits 150 has an n-bit digital signal converting capability, and is disposed on the respective vertical signal lines (column lines) 116-1 to 116-n. Thus, the column-parallel ADC blocks are formed.

Each of the column processing circuits 151 includes first and second comparators 152-1 and 152-2 that compare one analog signal (potential VSL), which is obtained from a pixel over the vertical signal line 116, with two of first and second reference voltages Vslop1 and Vslop2 whose polarities are different from each other.

The first and second reference voltages Vslop1 and Vslop2 are produced as sloping waves, which have mutually different polarities, vary linearly with certain slopes, and are produced by the DAC 161.

Further, each of the column processing circuits 151 includes a counter 153 that counts up so as to measure the comparison time taken by the first or second comparator 152-1 or 152-2, and a latch (memory) 154 that holds the result of counting performed by the counter 153.

When the level of the analog potential VSL crosses the level of the first reference voltage Vslop1, the first comparator 152-1 reverses the output signal SCMP1 thereof.

When the level of the analog potential VSL crosses the level of the second reference voltage Vslop2, the second comparator 152-2 reverses the output signal SCMP2 thereof.

The counter 153 performs a counting action synchronously with, for example, a clock CLK. When either of the output signal SCMP1 of the first comparator 152-1 and the output signal SCMP2 of the second comparator 152-2 is first reversed, the counter 153 ceases the counting action.

The variation in the first or second reference voltage Vslop1 or Vslop2 is converted into a variation in a time. The column processing circuit 151 counts the number of times by which a certain cycle (clock pulse) is repeated, and thus converts the time into a digital value.

When the analog signal VSL crosses the reference voltage Vslop1 or Vslop2, either of the outputs of the comparators is first reversed. Inputting the clock to the counter 153 is ceased, or a clock whose inputting is ceased is inputted to the counter 153. A/D conversion is then completed.

The outputs of the latches 154 are connected to the horizontal transfer line LTRF having a bit width of 2n bits.

The 2n amplification circuits 170 arranged correspondingly to the horizontal transfer line LTRF, and the signal processing circuit 180 are disposed.

As mentioned above, in the column ADC in accordance with the present embodiment, the two reference voltages Vslop1 and Vslop2 are used for one analog signal VSL outputted from a pixel. When either of the outputs of the two comparators 152-1 and 152-2 is reversed first, the counting action is terminated and A/D conversion is carried out.

Therefore, in the column ADC in accordance with the embodiment, a reversing time it takes for a high-power output is shortened. Compared with an ordinary constitution, A/D conversion can be achieved at a high speed.

Since an execution time for A/D conversion is shortened, the power consumption can be reduced.

In addition, high-bit precision A/D conversion can be realized without the necessity of raising a clock frequency or increasing a reading time.

After the period of A/D conversion is completed, data items held in the latches 153 are transferred over the horizontal transfer line LTRF by the horizontal transfer scan circuit 130, and inputted to the signal processing circuit 180 via the amplification circuit 170. A two-dimensional image is produced by performing predetermined signal processing.

The horizontal transfer scan circuit 130 performs concurrent parallel transfer on signals on several channels for the purpose of ensuring a transfer rate.

The timing control circuit 140 produces timing signals necessary to pieces of signal processing to be performed in the respective units including the pixel array 110 and group of column processing circuits 150.

The signal processing circuit 180 in the succeeding stage compensates, with use of a signal stored in the line memory 190, a missing vertical line or a missing point, performs clamping processing on the signal, and performs digital signal processing such as parallel-to-serial conversion, compression, encoding, addition, averaging, or an intermittent action.

In the line memory 190, a digital signal transmitted in units of a row of pixels is stored.

In the solid-state image sensing device 100 of the present embodiment, a digital output of the signal processing circuit 18 is transmitted as an input of an ISP or a baseband LSI.

As a technique to be used to read a pixel signal in a CMOS image sensor, there is a method of temporarily sampling signal charge that is produced from a light signal by a photoelectric converter such as photodiode, and reading it into a capacitor via a MOS switch located nearby.

In a sampling circuit, a noise inversely correlated to the capacitance of a sampling capacitor is produced. In a pixel, when signal charge is transferred to the sampling capacitor, the signal charge is fully transferred by utilizing a potential gradient. Therefore, no noise is produced in the course of sampling. However, a noise occurs when a voltage level at the preceding capacitor is reset to a standard value.

As a technique for removing the noise, a correlated double sampling (CDS) method is adopted.

This is a technique for reading and storing signal charge in a state immediately preceding sampling (reset level), reading a sampled signal level, and performing subtraction so as to remove a noise.

<3. Example of the Configuration of the DAC>

Next, an example of the configuration of the DAC 161 that produces the first and second reference voltages Vslop1 and Vslop2 having mutually different polarities will be described below.

Figure 6:
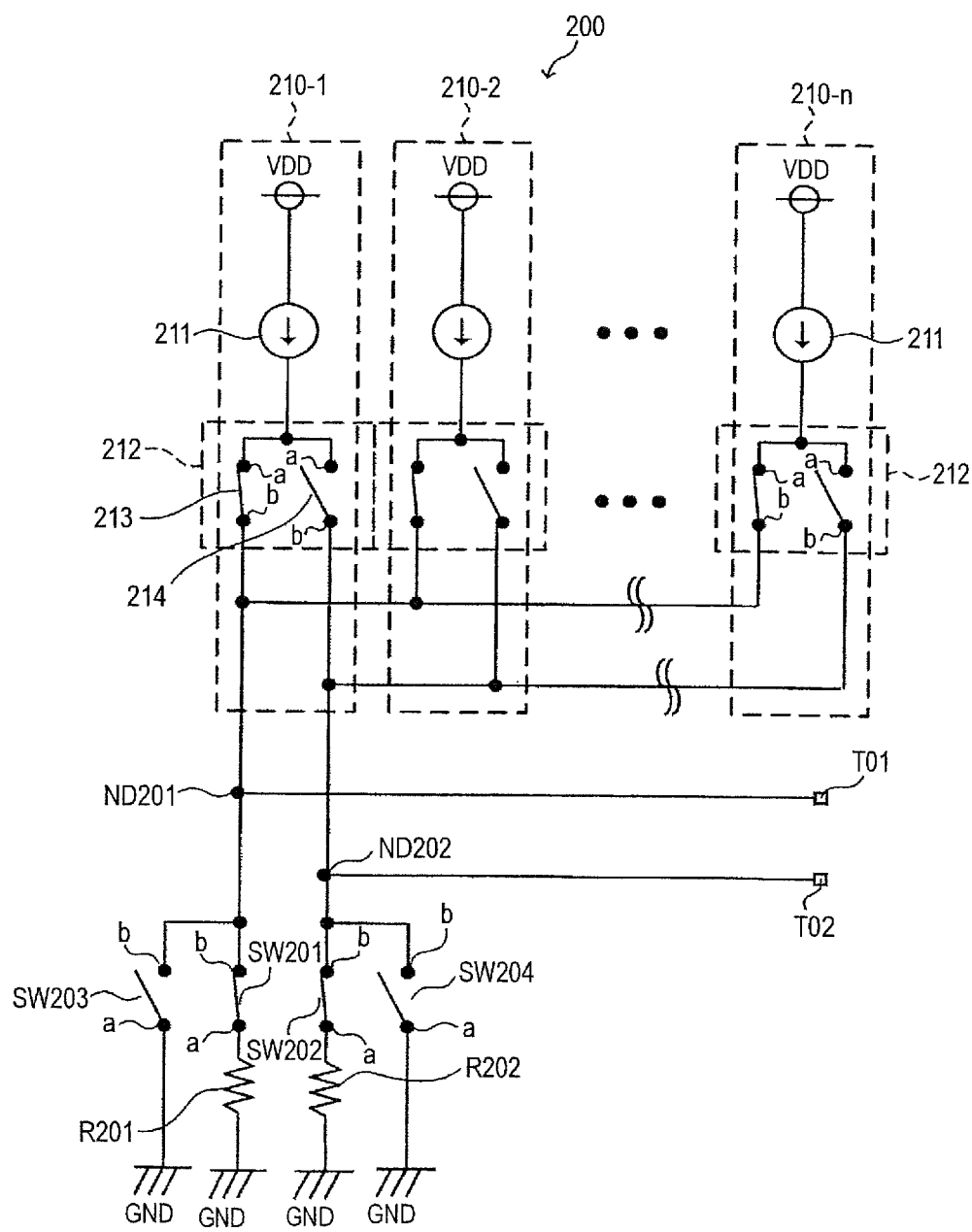
FIG. 6 is a diagram showing an example of the configuration of a reference voltage production unit serving as a DAC in accordance with the embodiment.
Figure 7:
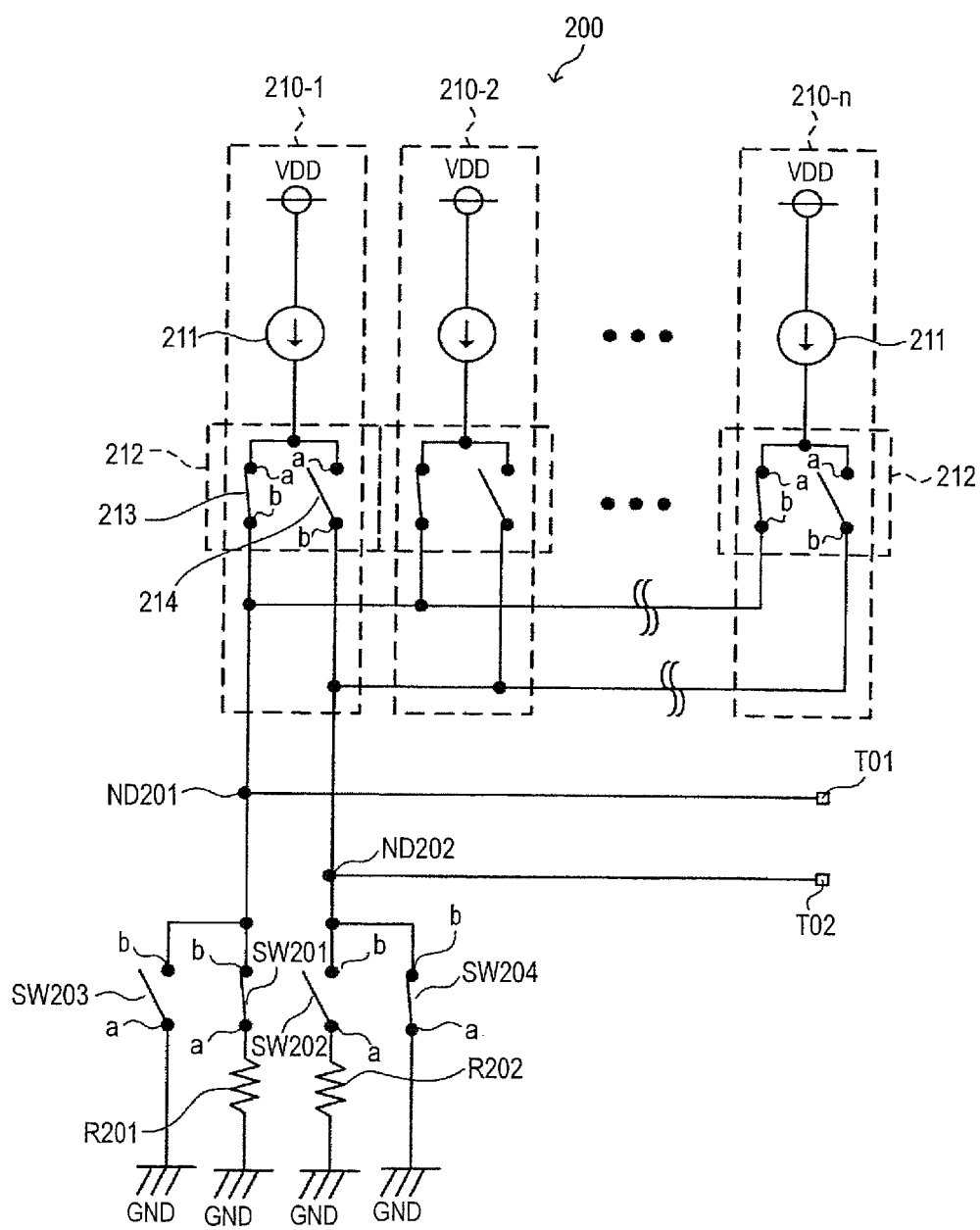
FIG. 7 is a diagram showing an example of the configuration of the reference voltage production unit serving as the DAC in accordance with the embodiment.

FIG. 6 and FIG. 7 are diagrams showing an example of the configuration of a reference voltage production unit that is the DAC employed in the present embodiment.

The reference voltage production unit 200 shown in FIG. 6 and FIG. 7 includes plural (n) unit blocks 210-1 to 210-n, a first node ND201, a second node ND202, a first sloping-wave output terminal TO1, and a second sloping-wave output terminal TO2.

Further, the reference voltage production unit 200 includes a first sloping-wave resistive element R201, a second sloping-wave resistive element R202, and switches SW201 to SW204.

The reference voltage production unit 200 is a circuit capable of producing the first reference voltage Vslop1 and second reference voltage Vslop2 having mutually different polarities.

The first reference voltage Vslop1 and second reference voltage Vslop2 are sloping waves that vary linearly with certain slopes.

When it says that the first and second reference voltages have mutually different polarities, it means that the slopes of the first reference voltage Vslop1 and second reference voltage Vslop2 that are ramp waves are positive and negative or are mutually inverse (reverse) (vertically opposite to each other), and are substantially vertically symmetrical.

In other words, the reference voltage production unit 200 produces the second reference voltage Vslop2, which has a slope vertically opposite to the slope of a standard voltage of the first reference voltage Vslop1 that is a ramp wave, together with the first reference voltage Vslop1.

When the P-phase level is read, the reference voltage production unit 200 produces only the first reference voltage Vslop1. When the D-phase level is read, the reference voltage production unit 200 produces the first reference voltage Vslop1 and second reference voltage Vslop2.

The reference voltage production unit 200 has the same number of juxtaposed unit blocks as the number of necessary bits and connected to the first node ND201 and second node ND202.

The unit blocks 210-1 to 210-n have the same configuration.

The unit block 210 includes a current source 211 connected to a power supply VDD and a sloping-wave selection switch 212.

The sloping-wave selection switch 212 includes a first sloping-wave switch 213 and a second sloping-wave switch 214.

The terminal a of the first sloping-wave switch 213 is connected to the current source 211, and the terminal b thereof is connected to the first node ND201.

The terminal a of the second sloping-wave switch 214 is connected to the current source 211, and the terminal b thereof is connected to the second node ND202.

The switch SW201 has the terminal a thereof connected to one end of the first sloping-wave resistive element R201, and has the terminal-b thereof-connected to the first node ND201. The other end of the first sloping-wave resistive element R201 is grounded.

The switch SW202 has the terminal a thereof connected to one end of the second sloping-wave resistive element R202, and has the terminal b thereof connected to the second node ND202. The other end of the second sloping-wave resistive element R202 is grounded.

The switch SW203 has the terminal a thereof grounded and has the terminal b thereof connected to the first node ND201.

The switch SW204 has the terminal a thereof grounded and has the terminal b thereof connected to the second node ND202.

The first node ND201 is connected to the first sloping-wave output terminal TO1, and the second node ND202 is connected to the second sloping-wave output terminal TO2.

In the reference voltage production unit 200, when the first reference voltage Vslop1 is outputted, the first sloping-wave switches 213 of the unit blocks 210-1 to 210-n are, as shown in FIG. 6, turned on.

The first sloping-wave switches 213 of the unit blocks 210-1 to 210-n are sequentially turned off, for example the first sloping-wave switch 213 of the unit block 210-1 is turned off at the beginning, synchronously with a counter clock. Thus, a current flowing into the first sloping-wave resistive element 201 is gradually decreased.

Accordingly, the first reference voltage Vslop1, that is, a sloping wave (ramp wave) that substantially linearly falls from, for example, a supply potential level to a ground potential is produced.

In the reference voltage production unit 200, when the second reference voltage Vslop2 is outputted, the second sloping-wave switches 214 of the unit blocks 210-1 to 210-n are, as shown in FIG. 6, turned off in advance.

The second sloping-wave switches 214 of the unit blocks 210-1 to 210-n are sequentially turned on, for example the second sloping-wave switch 214 of the unit block 210-1 is turned on at the beginning, synchronously with a counter clock in order to gradually increase a current that flows into the second sloping-wave resistive element 202.

Accordingly, the second reference voltage Vslop2, that is, a sloping wave (ramp wave) that substantially linearly rises from, for example, the ground potential level to the supply potential level is produced.

For producing only the first reference voltage Vslop1 during the period during which the P-phase level is read, the switches SW201 and SW202 are, as shown in FIG. 7, turned on, and the switches SW202 and SW203 are turned off.

For resetting the first reference voltage Vslop1 and second reference voltage Vslop2, the switches SW201 and SW202 are turned off and the switches SW203 and SW204 are turned on.

As mentioned above, a reverse-polarity sloping wave to be outputted from a DAC has to be prepared. It is easy for the DAC to output the sloping wave in terms of circuitry.

Figure 8:
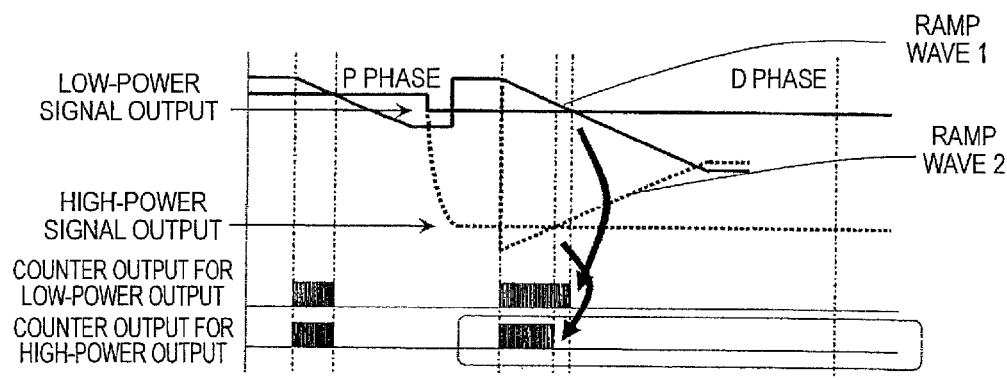
FIG. 8 is a timing chart for use in explaining actions to be performed in the solid-state image sensing device in accordance with the embodiment of the invention.

Next, actions to be performed in the foregoing components will be described in relation to the timing chart of FIG. 8.

When the P-phase level is read, the first reference voltage Vslop1 alone is produced by the reference voltage production unit 200 that is the DAC 161.

In each of the column processing circuits (ADC) 151, the analog signal potential VSL read onto the vertical signal line 116 is compared with the first reference voltage Vslop1 (a sloping wave that varies linearly with a certain slope) by the first comparator 152-1 disposed in each of the columns.

At this time, the counter 153 counts up until the level of the analog potential VSL crosses the level of the first reference voltage Vslop1 and the output of the comparator 152-1 is reversed. The potential (analog signal) VSL on the vertical signal line 116 is converted into a digital signal (A/D converted).

The A/D conversion is performed twice with respect to one time of reading.

During the first A/D conversion, a reset level (P-phase level) attained in the unit pixel 110A is read onto the vertical signal 116 (any of the vertical signal lines 116-1 to 116-n), and A/D conversion is executed.

The reset level or the P-phase level is affected with a variance among pixels.

During the second A/D conversion, a signal photoelectrically converted by the unit pixel 110A (D-phase level) is read onto the vertical signal line 116 (any of the vertical signal lines 116-1 to 116-n), and A/D conversion is executed.

When the D-phase level is read, the second reference voltage Vslop2 whose slope is vertically opposite to the slope of a standard voltage of the first reference voltage Vslop1 that is a ramp wave is produced together with the first reference voltage Vslop1 by the reference voltage production unit 200.

In each of the column processing circuits (ADC) 151, the analog signal potential VSL read onto the vertical signal line 116 is compared with the first reference voltage Vslop1 and second reference voltage Vslop2 by the first and second comparators 152-1 and 152-2 disposed in each of the columns.

At this time, the counter 153 counts up until the level of the analog potential VSL crosses the level of the first reference voltage Vslop1 or second reference voltage Vslop2 and either of the outputs of the first and second comparators 152-1 and 152-2 is reversed.

When the D-phase level is read, the output of the comparator that is reversed first is used to convert (A/D convert) the potential (analog signal) VSL on the vertical signal line 116 into a digital signal.

For example, when the analog signal potential VSL on the vertical signal line 116 is a low-power output (a variation from the P-phase level is limited), the output signal of the first comparator 152-1 to which the first reference voltage Vslop1 is inputted is used to execute A/D conversion.

When the analog signal potential VSL is a high-power output (a variation from the P-phase level is large), the output signal of the second comparator 152-2 to which the second reference voltage Vslop2 is inputted is used to execute A/D conversion.

Owing to the foregoing actions, when the second reference voltage Vlop2 is used, a count value is converted into a difference thereof from the upper-limit of count values. Compared with ordinary circuitry, a reversing time can be drastically shortened.

Correlated double sampling (CDS) is achieved by executing subtraction of the P-phase level from the D-phase level along with P-phase level conversion and D-phase level conversion.

Digitized signals are recorded in the latches (memories) 154, sequentially read into the amplification circuit 170 over the horizontal transfer line LTRF by the horizontal (column) transfer scan circuit 130, and finally outputted.

As mentioned above, column-parallel output processing is carried out.

As described so far, the solid-state image sensing device of the present embodiment includes the pixel array 110 having plural pixels, which perform photoelectric conversion, arrayed in the form of a matrix, and pixel signal reading circuits (group of column processing circuits or ADC) 150 that read data items from the pixel array 100 in units of a row.

The solid-state image sensing device 100 includes the reference voltage production unit 200 that is a circuit capable of producing the first reference voltage Vslop1 and second reference voltage Vslop2 having different polarities.

The group of column processing circuits 150 includes the first comparators 152-1 and second comparators 152-2 that compare one analog signal (potential VSL), which is obtained from each pixel over the vertical signal line 116, with either of the first and second reference voltages Vslop1 and Vslop2 having different polarities.

Further, each of the column processing circuits 151 includes the counter 153 that counts up so as to measure the comparison time taken by the first or second comparator 152-1 or 152-2, and the latch (memory) 154 that holds the result of counting performed by the counter 153.

Therefore, the present embodiment can provide an advantage described below.

According to the present embodiment, a reversing time it takes for a high-power output can be shortened. Compared with an ordinary constitution, A/D conversion can be performed at a high speed.

Since the execution time for A/D conversion can be shortened, the power consumption can be reduced.

In addition, high-bit precision A/D conversion can be achieved without the necessity of raising a clock frequency or increasing a reading time.

A reverse-polarity sloping wave to be outputted from a DAC has to be prepared. It is easy for the DAC to output the sloping wave in terms of circuitry.

The solid-state image sensing device having the foregoing advantage can be adopted as an image sensing device to be included in a digital camera or a video camera.

<4. Example of the Configuration of a Camera System>

Figure 9:
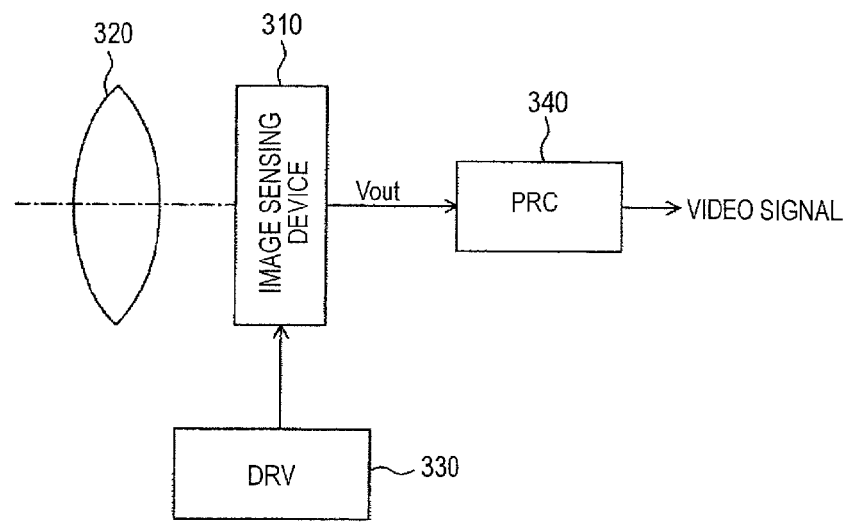
FIG. 9 is a diagram showing an example of the configuration of a camera system to which the solid-state image sensing device in accordance with the embodiment of the invention is applied.

FIG. 9 is a diagram showing an example of the configuration of a camera system to which the solid-state image sensing device in accordance with the embodiment of the present invention is applied.

A camera system 300 includes, as shown in FIG. 9, an image sensing device 310 to which the solid-state image sensing device 100 in accordance with the embodiment can be applied.

The camera system 300 includes a lens 320, which routes incident light (image light) to an image plane, as an optical system that introduces incident light to the pixel region of the image sensing device 310 (forms a subject image).

Further, the camera system 300 includes a drive circuit (DRV) 330 that drives the image sensing device 310, and a signal processing circuit (PRC) 340 that processes the output signal of the image sensing device 310.

The drive circuit 330 includes a timing generator (not shown) that produces various timing signals including a start pulse, with which the circuits included in the image sensing device 310 are driven, and a clock pulse, and drives the image sensing device 310 with a predetermined timing signal.

The signal processing circuit 340 performs predetermined signal processing on the output signal of the image sensing device 310.

An image signal processed by the signal processing circuit 340 is recorded in a recording medium, for example, a memory. Image information recorded in the recording medium is outputted as a hard copy from a printer or the like. The image signal processed by the signal processing circuit 340 is visualized as a motion picture on a monitor realized with a liquid crystal display or the like.

As mentioned above, the aforesaid solid-state image sensing device 100 is incorporated as the image sensing device 310 in imaging equipment such as a digital still camera, whereby a high-precision camera can be realized.

The present application contains subject matter related to that disclosed in Japanese Priority Patent Application JP 2009-097885 filed in the Japan Patent Office on Apr. 14, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An A/D converter comprising:
    a ramp signal production unit configured to produce only a first ramp signal while a reset level attained in a pixel is read out and to produce both the first ramp signal and a second ramp signal when a photoelectrically converted signal level is read out, the first ramp signal having a predetermined polarity and the second ramp signal having a different polarity from the first ramp signal.

2. An A/D converter comprising:
    a ramp signal production unit configured to produce a first ramp signal while a reset level attained in a pixel is read out and to produce both the first ramp signal and a second ramp signal when a photoelectrically converted signal level is read out, the first ramp signal having a predetermined polarity and the second ramp signal having a different polarity from the first ramp signal; and
    at least one A/D unit comprising:
        a first comparator configured to compare an input signal with the first ramp signal;
        a second comparator configured to compare the input signal with the second ramp signal; and
        a counter configured to measure a duration of a comparison period that begins at a timing when either of the first and second ramp signals start and ends at the earlier of a timing when the first comparator reverses an output signal thereof and a timing when the second comparator reverses an output signal thereof.

3. The A/D converter of claim 2,
    wherein the first ramp signal is applied to a first reference line that is connected to an input terminal of the first comparator, and the second ramp signal is applied to a second reference line that is connected to an input terminal of the second comparator,
    wherein the ramp signal production unit comprises a plurality of unit blocks, each of the unit blocks including:
        a current source,
        a first switching element connected between the current source and the first reference line, and
        a second switching element connected between the current source and the second reference line,
    wherein the ramp signal production unit produces both the first and second ramp signals together by sequentially performing a switching operation for each of the plurality of unit blocks, the switching operation comprising opening the first switching element and closing the second switching element.

4. The A/D converter of claim 2,
    wherein the second ramp signal is produced as a ramp wave whose slope is vertically opposite to the slope of a standard voltage of the first ramp signal that is a ramp wave.

5. A solid-state image sensing device comprising:
    a pixel array including a plurality of pixels arrayed in the form of a matrix, each configured to perform photoelectric conversion; and a readout circuit that is configured to read out signals from the plurality of pixels, the readout circuit including the A/D converter of claim 2.

6. The solid state image sensing device of claim 5,
wherein the A/D converter includes a plurality of column A/D units, including the at least one A/D unit, each connected to a corresponding signal line of the pixel array and each including:
   a first comparator configured to compare an input signal from the corresponding signal line with the first ramp signal;
   a second comparator configured to compare the input signal with the second ramp signal; and
   a counter configured to measure a duration of a comparison period that begins at a timing when either of the first and second ramp signals start and ends at the earlier of a timing when the first comparator reverses an output signal thereof and a timing when the second comparator reverses an output signal thereof.

7. The solid state image sensing device of claim 5,
wherein the ramp signal production unit comprises a plurality of unit blocks, each of the unit blocks including:
   a current source,
   a first switching element connected between the current source and a first reference line, and
   a second switching element connected between the current source and a second reference line,
wherein the ramp signal production unit produces both the first and second ramp signals together by sequentially performing a switching operation for each of the plurality of unit blocks, the switching operation comprising opening the first switching element and closing the second switching element.

8. The solid state image sensing device of claim 5,
wherein each of the pixels includes:
   an output node;
   a photoelectric converter that converts a light signal into an electric signal and accumulates signal charge;
   a transfer element that is turned on or off with a driving signal and that when being turned on, transfers the charge in the photoelectric converter to the output node; and
   a reset element that resets the output node with a reset signal.

9. A camera system comprising:
the solid-state image sensing device of claim 5; and
an optical system that forms a subject image on the solid-state image sensing device.

10. A camera system comprising:
the solid-state image sensing device of claim 7; and
an optical system that forms a subject image on the solid-state image sensing device.

11. An A/D converter comprising:
a ramp signal production unit configured to simultaneously produce a first ramp signal and a second ramp signal, the first ramp signal having a predetermined polarity and the second ramp signal having a different polarity from the first ramp signal;
a first comparator configured to compare an input signal with the first ramp signal;
a second comparator configured to compare the input signal with the second ramp signal; and
a counter configured to measure a duration of a comparison period that begins at a timing when either of the first and second ramp signals start and ends at the earlier of a timing when the first comparator reverses an output signal thereof and a timing when the second comparator reverses an output signal thereof,
wherein the first ramp signal is applied to a first reference line that is connected to an input terminal of the first comparator, and the second ramp signal is applied to a second reference line that is connected to an input terminal of the second comparator,
wherein the ramp signal production unit comprises a plurality of unit blocks, each of the unit blocks including:
   a current source,
   a first switching element connected between the current source and the first reference line, and
   a second switching element connected between the current source and the second reference line,
wherein the ramp signal production unit produces both the first and second ramp signals together by sequentially performing a switching operation for each of the plurality of unit blocks, the switching operation comprising opening the first switching element and closing the second switching element.

12. The A/D converter of claim 11,
wherein the ramp signal production unit is configured to produce the first ramp signal while a reset level attained in a pixel is read out and to simultaneously produce both the first ramp signal and the second ramp signal when a photoelectrically converted signal level is read out.

13. The A/D converter of claim 11,
wherein the second ramp signal is produced as a ramp wave whose slope is vertically opposite to the slope of a standard voltage of the first ramp signal that is a ramp wave.

14. A solid state imaging device comprising:
a pixel array including a plurality of pixels arrayed in the form of a matrix, each configured to perform photoelectric conversion; and
a readout circuit that is configured to read out signals from the plurality of pixels, the readout circuit including the A/D converter of claim 11.

15. The solid state imaging device of claim 14,
wherein the ramp signal production unit is configured to produce the first ramp signal while a reset level attained in one of the plurality of pixels is read out and to simultaneously produce both the first ramp signal and the second ramp signal when a photoelectrically converted signal level is read out.

16. The solid state imaging device of claim 14,
wherein the second ramp signal is produced as a ramp wave whose slope is vertically opposite to the slope of a standard voltage of the first ramp signal that is a ramp wave.

17. A camera system comprising:
the solid-state image sensing device of claim 14; and
an optical system that forms a subject image on the solid-state image sensing device.

18. A camera system comprising:
the solid-state image sensing device of claim 15; and
an optical system that forms a subject image on the solid-state image sensing device.

* * * * *